(12) United States Patent
Miao et al.

(10) Patent No.: US 11,704,489 B2
(45) Date of Patent: Jul. 18, 2023

(54) DOCUMENT-BASED REQUIREMENTS EXTRACTION

(71) Applicant: International Business Machines Corporation, Armonk, NY (US)

(72) Inventors: Wan Wan Miao, Ningbo (CN); Sheng Hui Zhan, Ningbo (CN); Zhi Lin Hu, Ningbo (CN); Shu Xia Cao, Beijing (CN); Jian Hui Chen, Ningbo (CN); Tao Liu, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 16/917,138

(22) Filed: Jun. 30, 2020

(65) Prior Publication Data

US 2021/0406466 A1 Dec. 30, 2021

(51) Int. Cl.
*G06F 40/279* (2020.01)
*G06N 20/00* (2019.01)

(52) U.S. Cl.
CPC .......... *G06F 40/279* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 11,562,143 B2 * | 1/2023 | Priestas | G06F 40/284 |
| 11,567,979 B2 * | 1/2023 | Kukla | G06F 16/338 |
| 2012/0078969 A1 | 3/2012 | Ananthanarayanan et al. | |
| 2013/0018825 A1 * | 1/2013 | Ghani | G06N 20/00 706/12 |
| 2017/0132203 A1 * | 5/2017 | Kim | G06F 40/279 |

FOREIGN PATENT DOCUMENTS

CN 106960002 A 7/2017

OTHER PUBLICATIONS

Arora, "Extracting Domain Models form Natural-Language Requirements: Approach and Industrial Evaluation", MODELS' 16, Oct. 2-7, 2016, Saint-Malo, France, DOI: http://dx.doi.org/10.1145/2976767.2976769, 11 pages.

Miao, et al. (2020). A Method to Create Document-based Requirement Extraction Model [PowerPoint slides]; 13 pages.

Anonymously, "Analyzing Responses to Requests for Proposals", IP.com, Jun. 29, 2017, IP.com No. IPCOM000250335D; 5 pages.

* cited by examiner

*Primary Examiner* — Nafiz E Hoque
(74) *Attorney, Agent, or Firm* — Yee & Associates, P.C.

(57) ABSTRACT

A computer-implemented method, system, and computer program product for identifying requirements in a document. A document including requirements is received. Attribute related information in the document is identified using an attribute model. Component information in the document is identified using a component model. The attribute related information and the component information identified in the document are merged. Requirements in the document are identified from the merged attribute related information and component information. The requirements identified in the document are used to develop a product.

14 Claims, 9 Drawing Sheets

DOCUMENT-BASED REQUIREMENTS EXTRACTION

BACKGROUND

1. Field

The disclosure relates generally to a computer implemented system and method and a computer program product for automatically identifying requirements in a requirements document.

2. Description of the Related Art

Construction, industrial machinery, specialty materials, and specialty packaging companies deal with complex requests for proposal, RFPs, or contracts as a core part of their business practices. To remain competitive, these companies need to analyze complex requirements to engineer high quality products.

The process for analyzing complex documents is usually knowledge intensive, relying on the deep experience of a few individuals. The time required to become an expert in a particular area is long. A relatively large effort is needed to setup, update and finalize the domain knowledge graph for the experts of each domain. The domain knowledge across different domain areas, such as construction, industrial machinery, specialty materials, and specialty packaging are quite different.

Therefore, it would be desirable to have a method and apparatus that take into account at least some of the issues discussed above, as well as other possible issues.

SUMMARY

According to an illustrative embodiment, a computer-implemented method of identifying requirements in a document is provided. The document is received. Component information in the document is identified using a component model. Attribute related information in the document is identified using an attribute model. The component information and the attribute related information identified in the document are merged. The requirements in the document are identified from the merged component information and attribute related information. The requirements identified in the document are used to produce a product.

According to another illustrative embodiment, a system for identifying requirements in a document is provided. The system comprises a data processing system configured to: receive the document, identify component information in the document using a component model, identify attribute related information in the document using an attribute model, merge the component information and the attribute related information identified in the document, identify the requirements in the document from the merged component information and attribute related information, and use the requirements identified in the document to produce a product.

According to yet another illustrative embodiment, a computer program product for identifying requirements in a document also is provided. The computer program product comprises a computer readable storage medium having program instructions embodied therewith. The program instructions are executable by a device to cause the device to: receive the document, identify component information in the document using a component model, identify attribute related information in the document using an attribute model, merge the component information and the attribute related information identified in the document, identify the requirements in the document from the merged component information and attribute related information, and use the requirements identified in the document to produce a product.

Other variations are possible, as described below.

DETAILED DESCRIPTION

Figure 1:
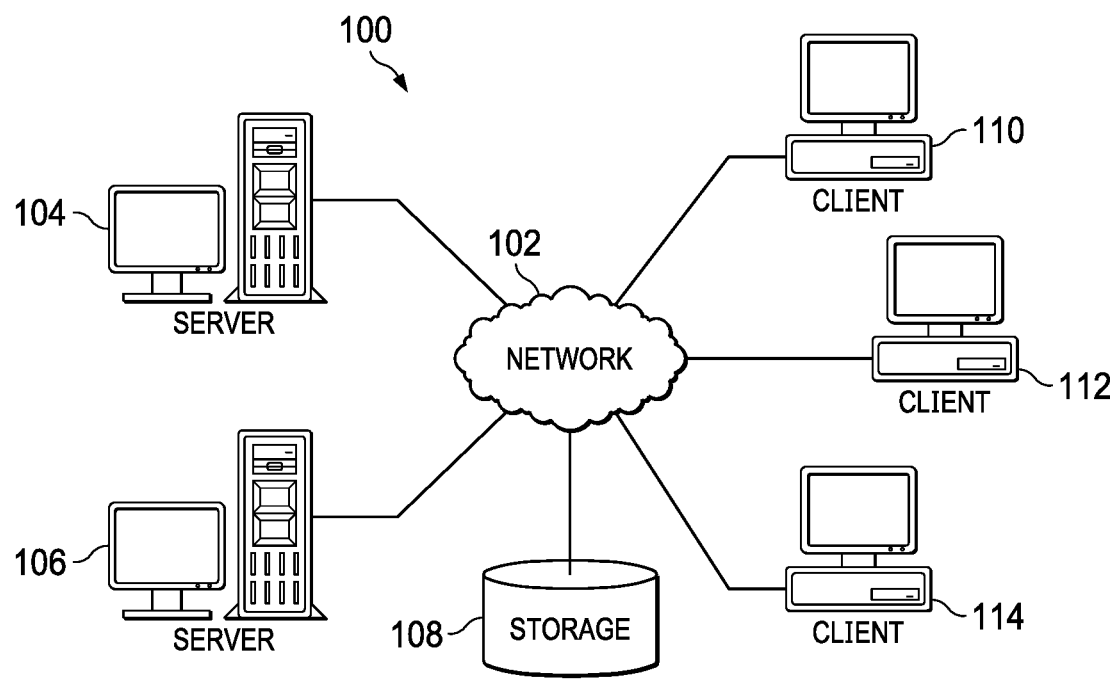
FIG. 1 is a pictorial representation of a network of data processing systems in which illustrative embodiments may be implemented.

The illustrative embodiments provide a requirements extraction domain model that can be used to extract requirements from documents like RFPs, statements of work, contracts, and the like. In accordance with an illustrative embodiment, a domain model consists of two parts: a component model and an attribute model. The component model is domain specific. It is extracted and summarized by a user based on their specific domain knowledge. A component model for a new domain can be created automatically. The attribute model is a common model that is applicable for all domains. A domain model in accordance with an illustrative embodiment can be continuously improved by user feedback and self-learning.

The illustrative embodiments may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the illustrative embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client devices 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
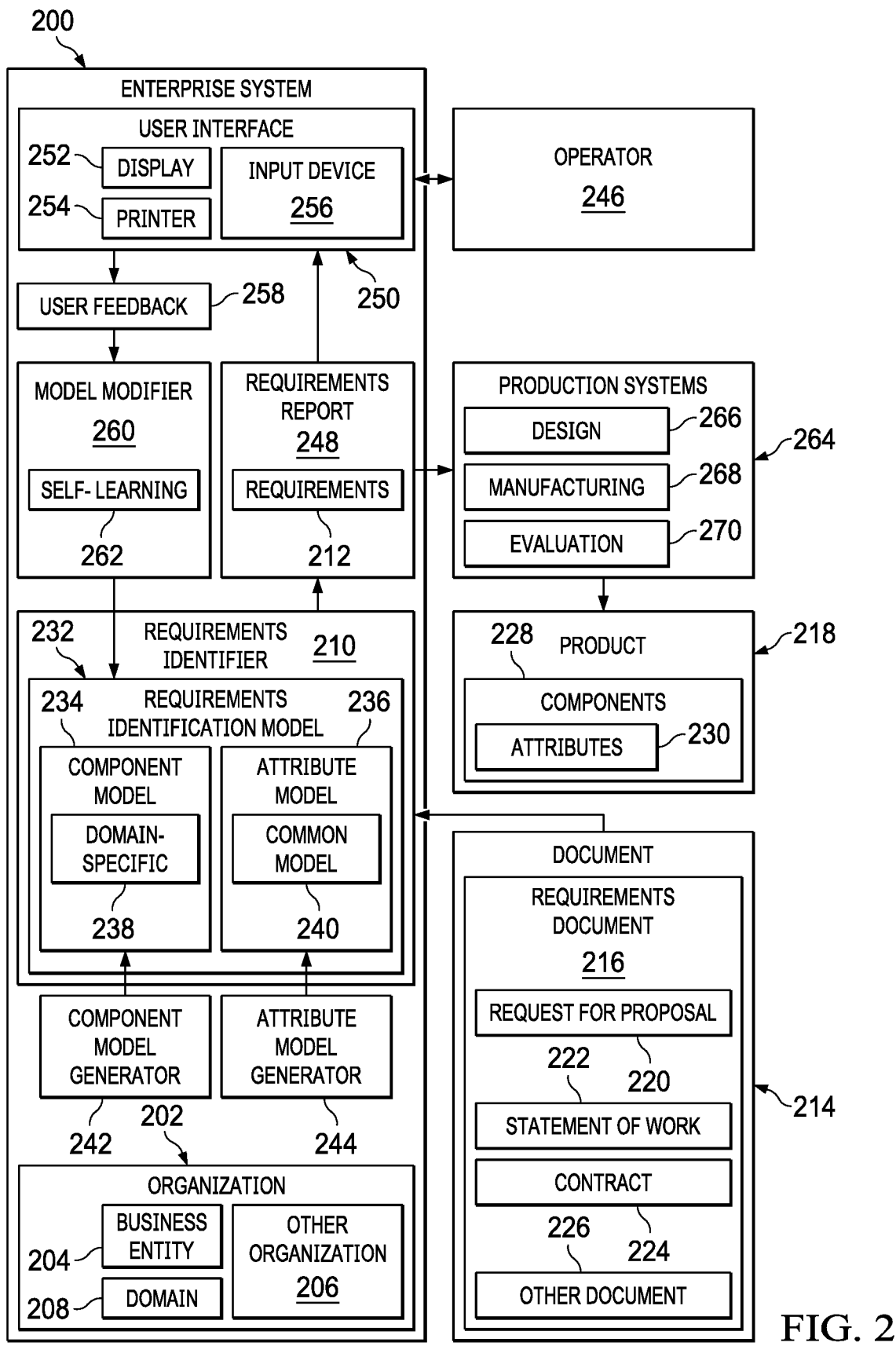
FIG. 2 is a block diagram of an enterprise system configured to identify and use requirements in a document in accordance with an illustrative embodiment.

With reference to FIG. 2, a block diagram of enterprise system 200 configured to identify and use requirements in a document is depicted in accordance with an illustrative embodiment. In this illustrative example, enterprise system 200 includes components that may be implemented in hardware such as the hardware shown in network data processing system 100 in FIG. 1.

Enterprise system 200 may be implemented in software, hardware, firmware or a combination thereof. When software is used, the operations performed by enterprise system 200 may be implemented in program code configured to run on hardware, such as a processor unit. When firmware is used, the operations performed by enterprise system 200 may be implemented in program code and data and stored in persistent memory to run on a processor unit. When hardware is employed, the hardware may include circuits that operate to perform the operations in enterprise system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Enterprise system 200 may be operated by or for any appropriate organization 202. For example, without limitation, organization 202 may be business entity 204 or other organization 206. Organization 202 may perform business or other appropriate operations in domain 208.

Requirements identifier 210 may be implemented in enterprise system 200. Requirements identifier 210 is configured to identify requirements 212 in document 214. Document 214 may be any appropriate requirements document 216 including requirements 212 therein for product 218. For example, without limitation, requirements document 216 may be request for proposal 220, statement of work 222, contract 224, or other document 226.

Product 218 may be any appropriate physical product. Alternatively, product 218 may comprise services or services in combination with a physical product. Requirements 212 may define any appropriate required characteristic of product 218. For example, requirements 212 may define required components 228 of product 218 and required attributes 230 of components 228.

Requirements identifier 210 is configured to identify requirements 212 in document 214 using requirements identification model 232. In accordance with an illustrative embodiment, requirements identification model 232 includes component model 234 and attribute model 236. Component model 234 is domain-specific 238. In contrast, attribute model 236 is common model 240 that applies to many or all domains. Component model 234 may be created using component model generator 242. Attribute model 236 may be created using attribute model generator 244.

Requirements 212 in document 214 that are identified by requirements identifier 210 may be provided for use by operator 246 in requirements report 248. Requirements report 248 may be provided to operator 246 in any appropriate format on user interface 250. For example, requirements report 248 may be presented to operator 246 on display 252 in user interface 250. Alternatively, or in addition, requirements report 248 may be printed using printer 254 in user interface 250.

Operator 246 may interact with user interface 250 via any appropriate input device 256. For example, without limitation, operator 246 may use input device 256 to provide user feedback 258 to model modifier 260. Model modifier 260 may be configured to modify requirements identification model 232 based on user feedback 258. For example, without limitation, requirements identification model 232 may be self-learning 262.

Requirements 212 identified in requirements report 248 may be used to produce product 218 in a manner that satisfies requirements 212. Requirements 212 identified in requirements report 248 may be used in any appropriate part of a process for producing product 218. For example, without limitation, requirements 212 may be used in production systems 264 for one or more of design 266 of product 218, manufacturing 268 of product 218, and evaluation 270 of product 218.

The illustration of enterprise system 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
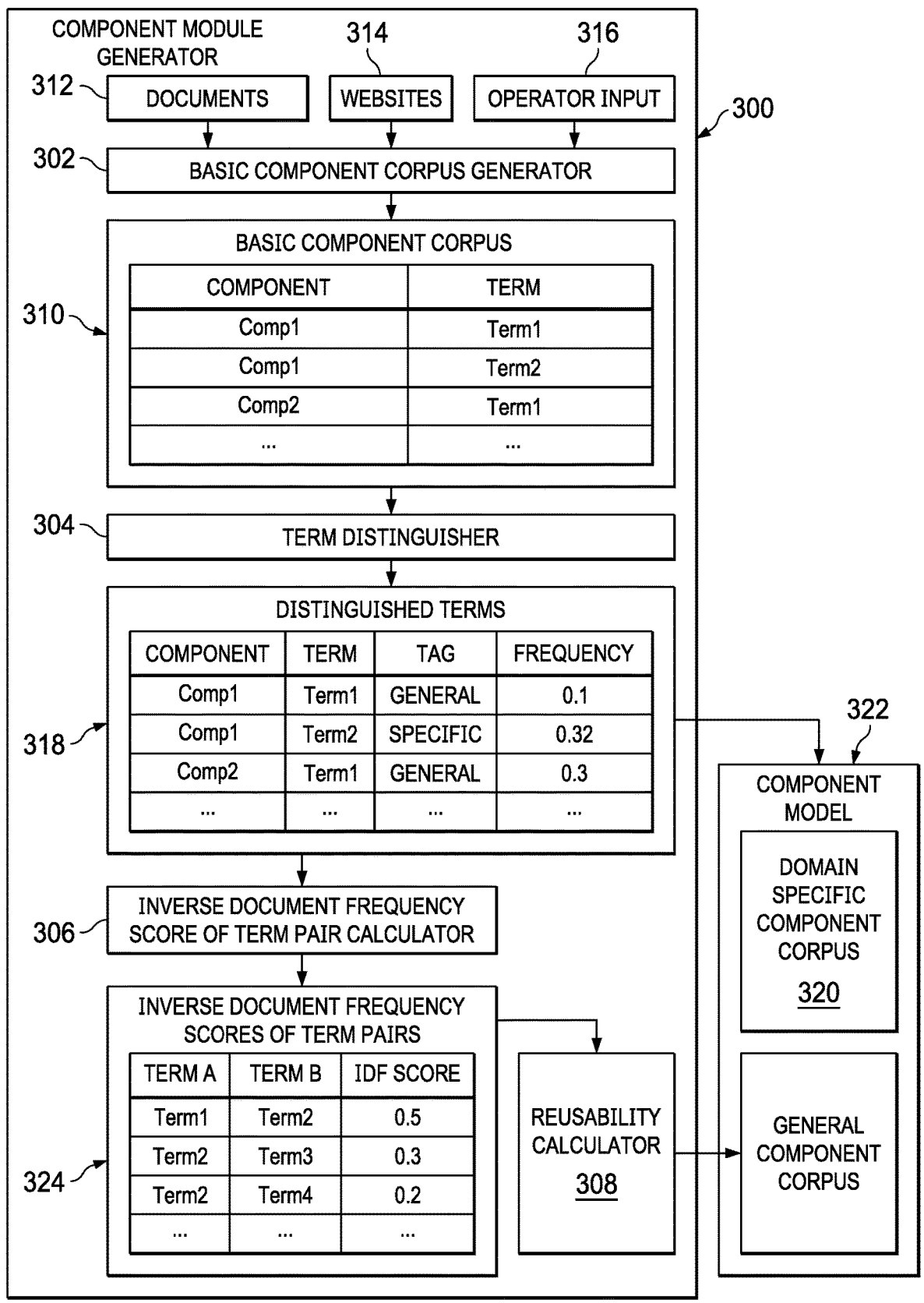
FIG. 3 is a block diagram of a component model generator in accordance with an illustrative embodiment.

With reference to FIG. 3, a block diagram of component model generator 300 is depicted in accordance with an illustrative embodiment. Component model generator 300 is an example of one implementation of component model generator 242 in enterprise system 200 in FIG. 2. Component model generator 300 may include basic component corpus generator 302, term distinguisher 304, inverse document frequency score calculator 306, and reusability calculator 308.

Basic component corpus generator 302 is configured to generate basic component corpus 310 from one or more of documents 312, websites 314, and operator input 314. Term distinguisher 304 is configured to identify distinguished terms 318 in basic component corpus 310. Distinguished terms 318 are used to form domain specific component corpus 320 portion of component model 322.

Inverse document frequency score calculator 306 is configured to generate inverse document frequency scores of term pairs 324 from distinguished terms 318. Reusability calculator 308 uses inverse document frequency scores of term pairs 324 to identify reusable general component corpus 326 portion of component model 322.

The illustration of component model generator 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
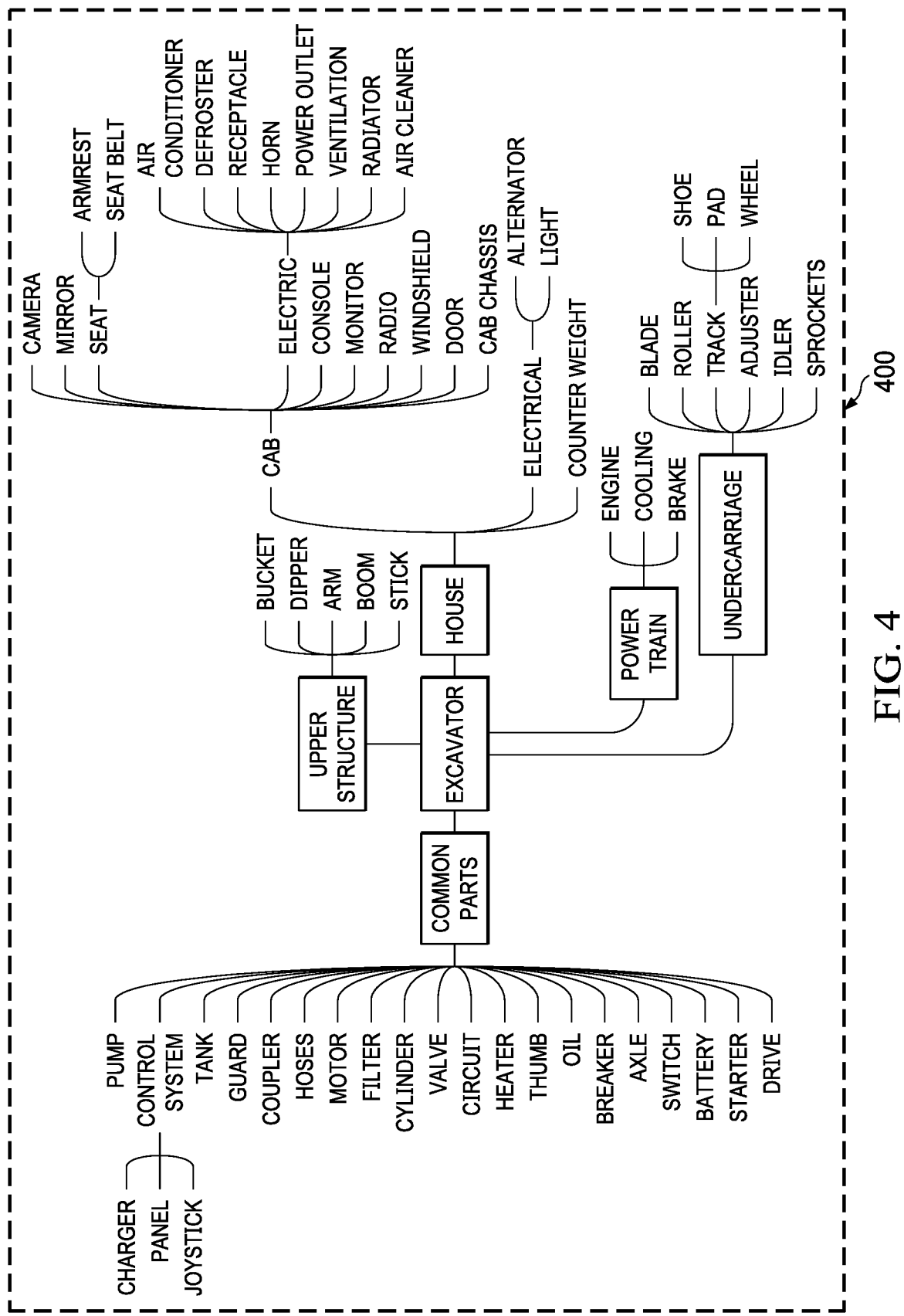
FIG. 4 is an illustration of an example of a component model in accordance with an illustrative embodiment.

With reference to FIG. 4, an illustration of an example of a component model is depicted in accordance with an illustrative embodiment. Component model 400 is an example of one implementation of component model 234 in FIG. 2.

Figure 5:
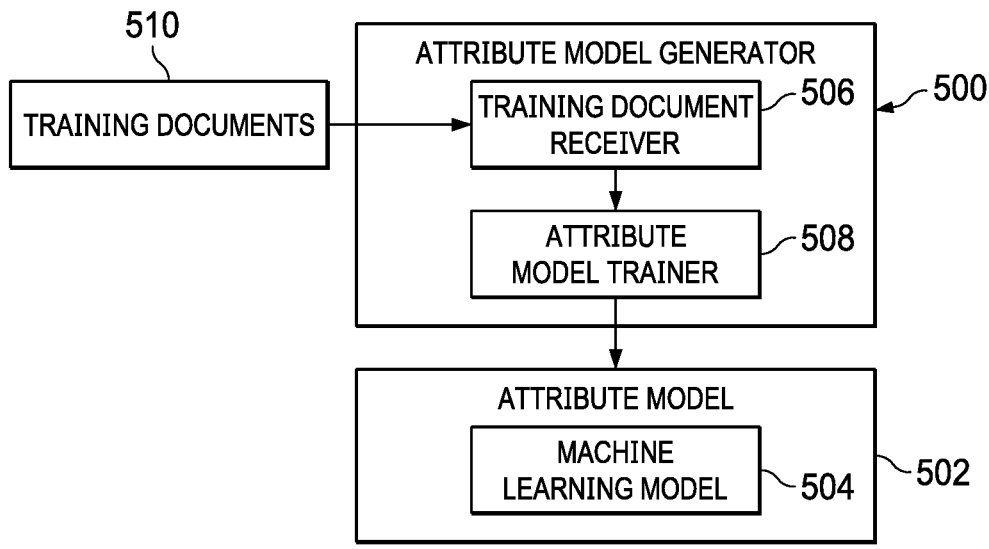
FIG. 5 is a block diagram of an attribute model generator in accordance with an illustrative embodiment.

With reference to FIG. 5, a block diagram of attribute model generator 500 is depicted in accordance with an illustrative embodiment. Attribute model generator 500 is an example of one implementation of attribute model generator 244 in enterprise system 200 in FIG. 2.

In accordance with an illustrative embodiment, attribute model 502 may be implemented as machine learning model 504. In this example, attribute model generator 500 may include training document receiver 506 and attribute model trainer 508. Training document receiver 506 is configured to receive training documents 506. Attribute model trainer 508 is configured to use training documents 510 to train attribute model 502 in a known manner.

The illustration of attribute model generator 500 in FIG. 5 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 6:
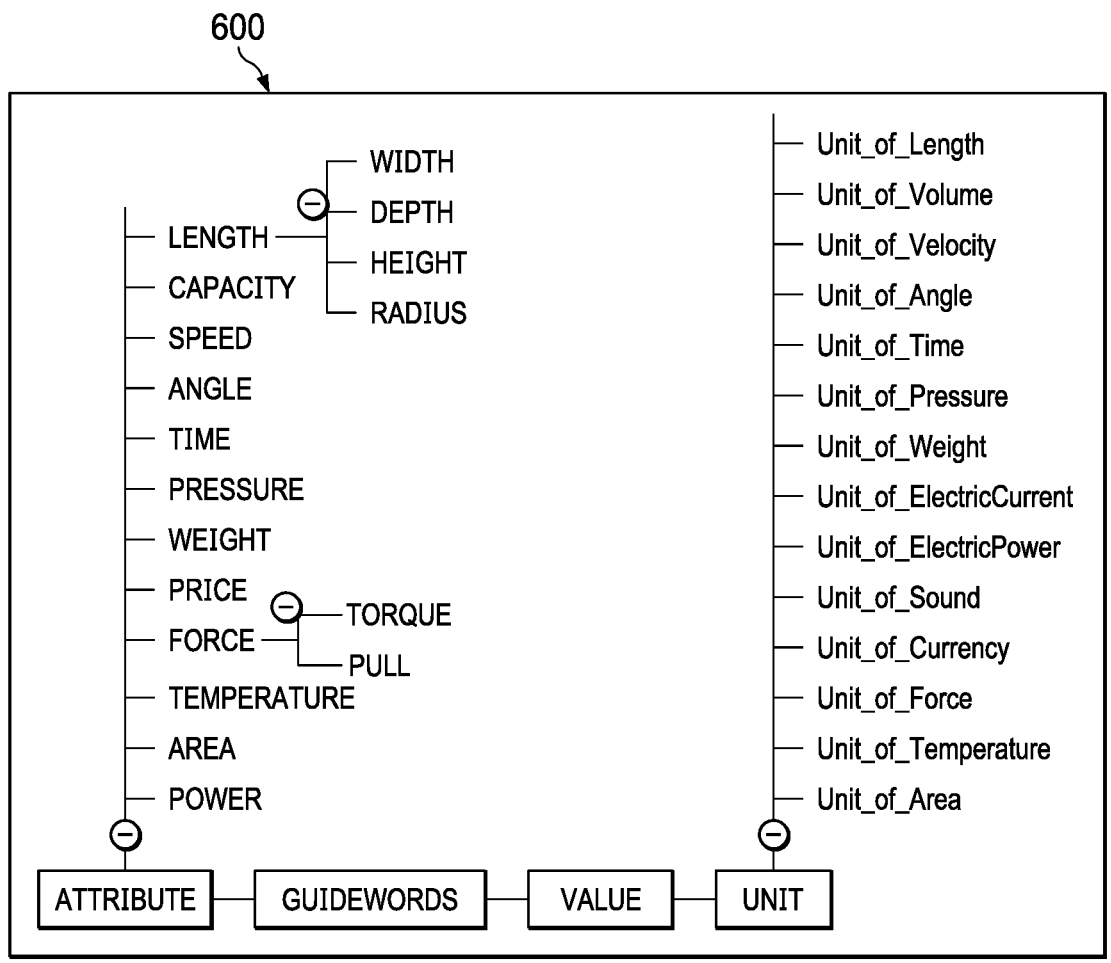
FIG. 6 is an illustration of an example of an attribute model in accordance with an illustrative embodiment.

With reference to FIG. 6, an illustration of an example of attribute model 600 is depicted in accordance with an illustrative embodiment. Attribute model 600 is an example of one implementation of attribute model 236 in FIG. 2.

Figure 7:
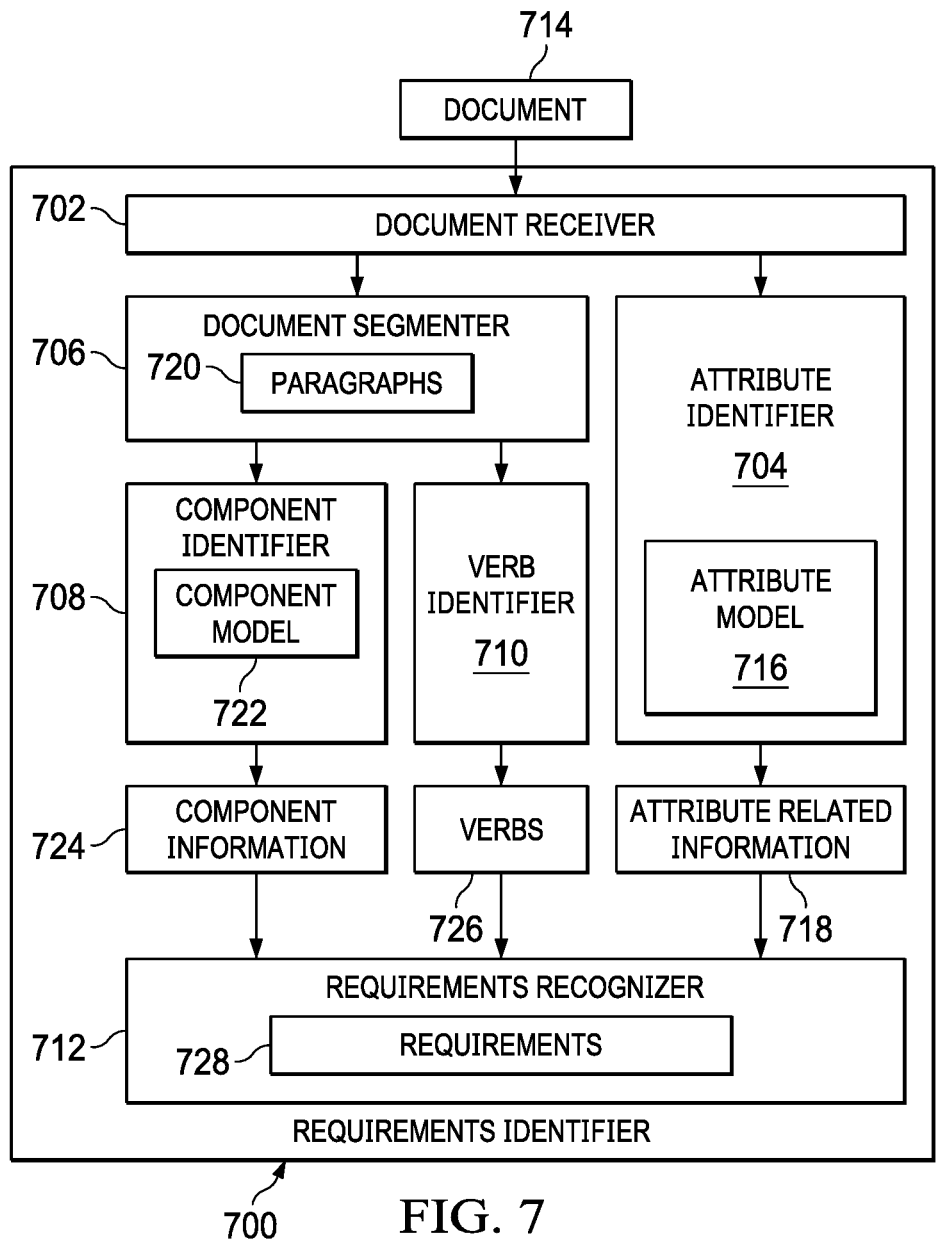
FIG. 7 is a block diagram of a requirements identifier in accordance with an illustrative embodiment.

With reference to FIG. 7, a block diagram of requirements identifier 700 is depicted in accordance with an illustrative embodiment. Requirements identifier 700 is an example of one implementation of requirements identifier 210 in enterprise system 200 in FIG. 2. Requirements identifier 700 may include document receiver 702, attribute identifier 704, document segmenter 706, component identifier 708, verb identifier 710, and requirements recognizer 712.

Document receiver 702 is configured to receive document 714. Attribute identifier 704 is configured to use attribute model 716 to identify attribute related information 718 in document 714.

Document segmenter 706 is configured to identify paragraphs 720 in the text in document 714. Component identifier 708 is configured to use component model 722 to identify component information 724 in paragraphs 720. Verb identifier 710 is configured to identify verbs 726 in paragraphs 720. Requirements recognizer 712 is configured to identify requirements 728 from merged attribute related information 718, component information 724, and verbs 726.

The illustration of requirements identifier 700 in FIG. 7 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 8:
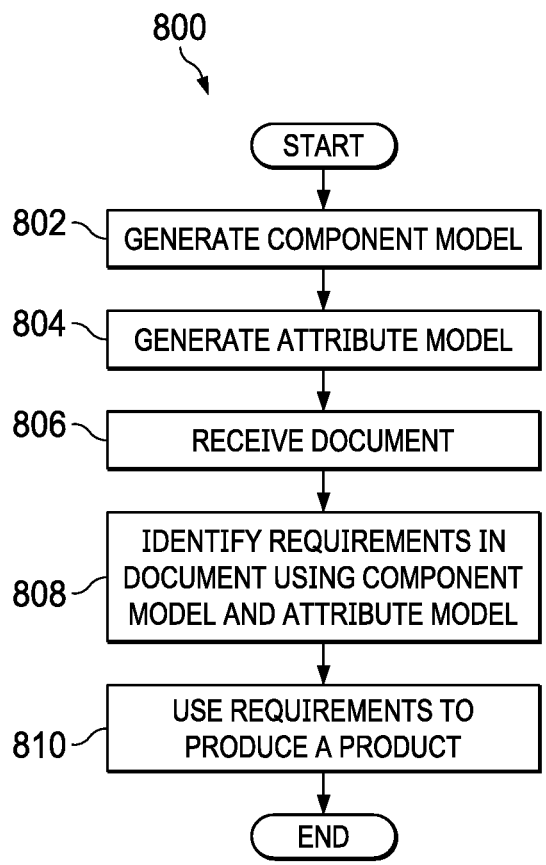
FIG. 8 is an illustration of a flowchart of a process of identifying and using requirements in a document in accordance with an illustrative embodiment.

Turning to FIG. 8, an illustration of a flowchart of a process of identifying and using requirements in a document is depicted in accordance with an illustrative embodiment. Process 800 may be implemented, for example, in enterprise system 200 in FIG. 2.

Process 800 begins with generating a component model (operation 802) and generating an attribute model (operation 804). A document may then be received (operation 806). Requirements are identified in the document using the component model and the attribute model (operation 808). The identified requirements may then be used to produce a product (operation 810), with the process terminating thereafter.

Figure 9:
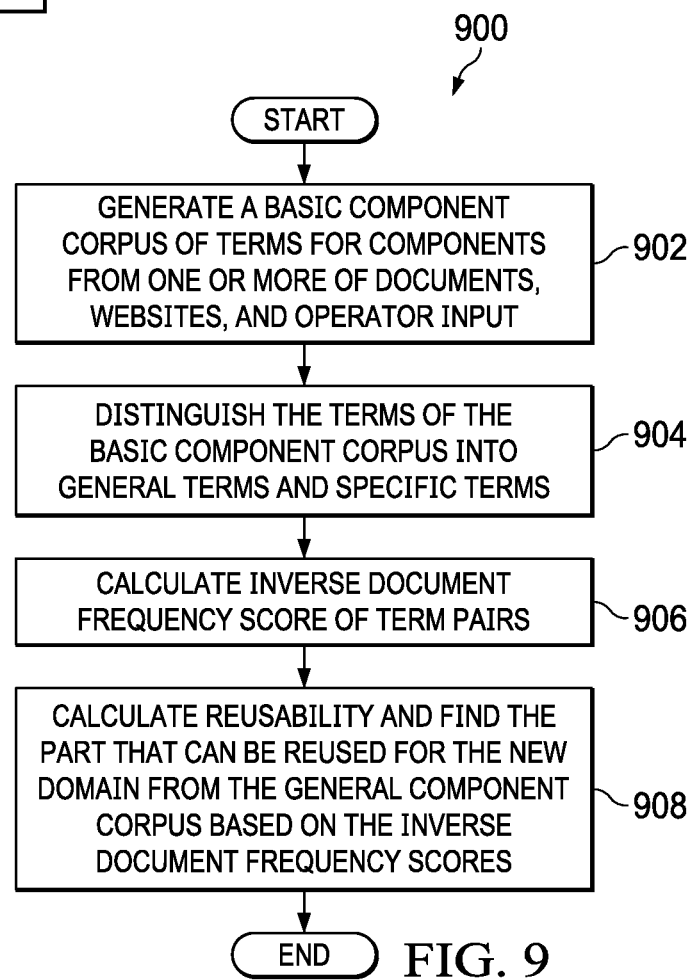
FIG. 9 is an illustration of a flowchart of a process of generating a component model in accordance with an illustrative embodiment.

Turning to FIG. 9, an illustration of a flowchart of a process of generating a component model is depicted in accordance with an illustrative embodiment. Process 900 may be implemented, for example, in component model generator 300 in FIG. 3. Process 900 is an example of one implementation of operation 802 in process 800 in FIG. 8.

Process 900 begins with generating a basic component corpus of terms for components from one or more of documents, web sites, and operator input (operation 902). Terms of the basic component corpus are distinguished into general terms and specific terms (operation 904). Inverse document frequency scores of term pairs are calculated (operation 906). Reusability is calculated and the part that can be reused for the new domain is identified from the general component corpus based on the inverse document frequency scores (operation 908), with the process terminating thereafter.

Figure 10:
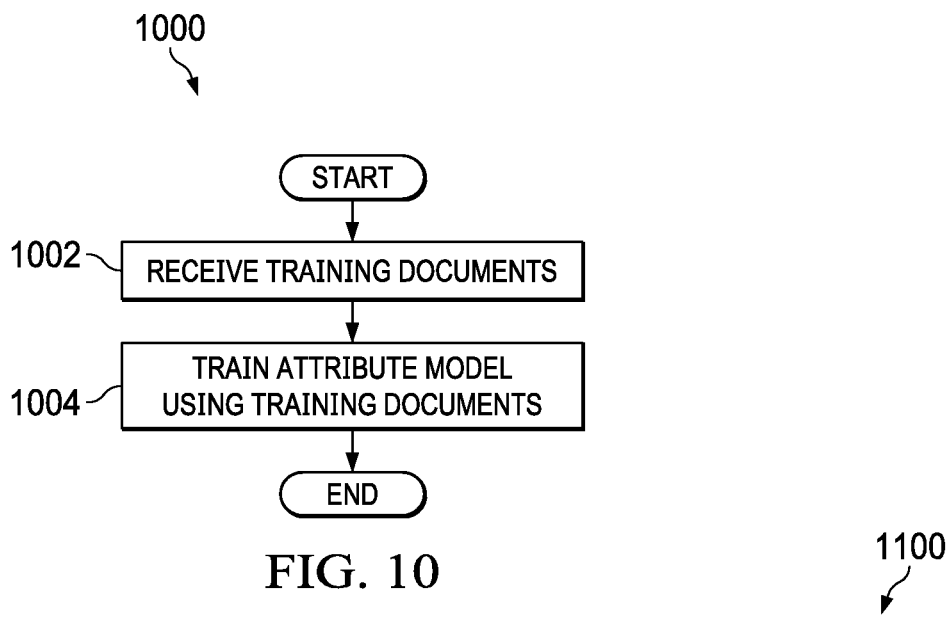
FIG. 10 is an illustration of a flowchart of a process of generating an attribute model in accordance with an illustrative embodiment.

Turning to FIG. 10, an illustration of a flowchart of process 1000 of generating an attribute model is depicted in accordance with an illustrative embodiment. Process 1000 may be implemented, for example, in attribute model generator 500 in FIG. 5. Process 1000 is an example of one implementation of operation 804 in process 800 in FIG. 8.

Process 1000 begins with receiving training documents (operation 1002). The training documents are then used to train the attribute model (operation 1004), with the process terminating thereafter.

Figure 11:
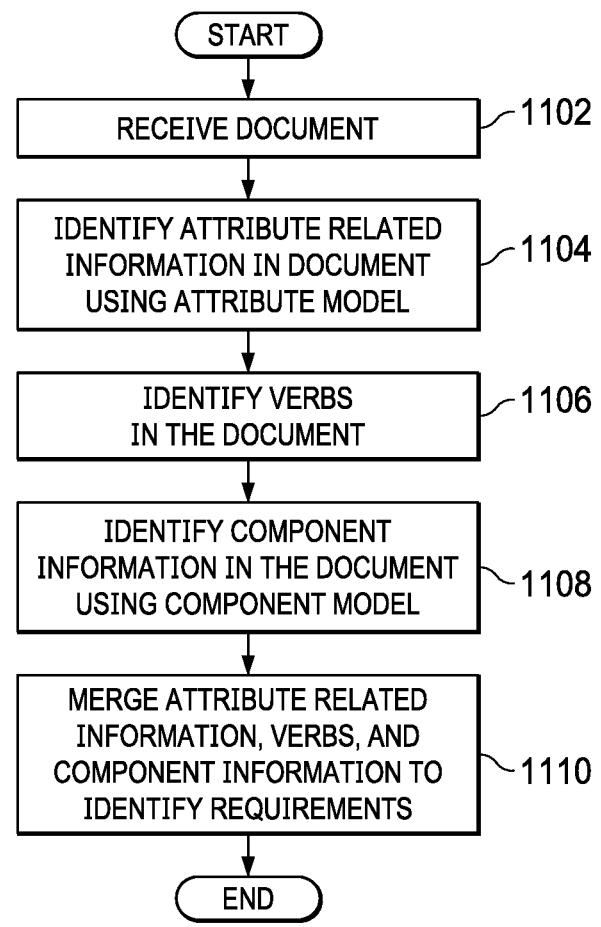
FIG. 11 is an illustration of a flowchart of process of identifying requirements in a document in accordance with an illustrative embodiment.

Turning to FIG. 11, an illustration of a flowchart of process 1100 of identifying requirements in a document is depicted in accordance with an illustrative embodiment. Process 1100 may be implemented, for example, in requirements identifier 700 in FIG. 7.

Process 1100 begins with receiving a document (operation 1102). Attribute related information in the document is identified using an attribute model (operation 1104). Verbs in the document are identified (operation 1106.) And component information in the document is identified using a component model (operation 1108). The attribute related information, verbs, and component information is then merged to identify requirements (operation 1110), with the process terminating thereafter.

The processes in FIGS. 8-11 can be implemented in hardware, software, or both. When implemented in software, the processes can take the form of program code that is run by one or more processor units located in one or more hardware devices in one or more computer systems.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
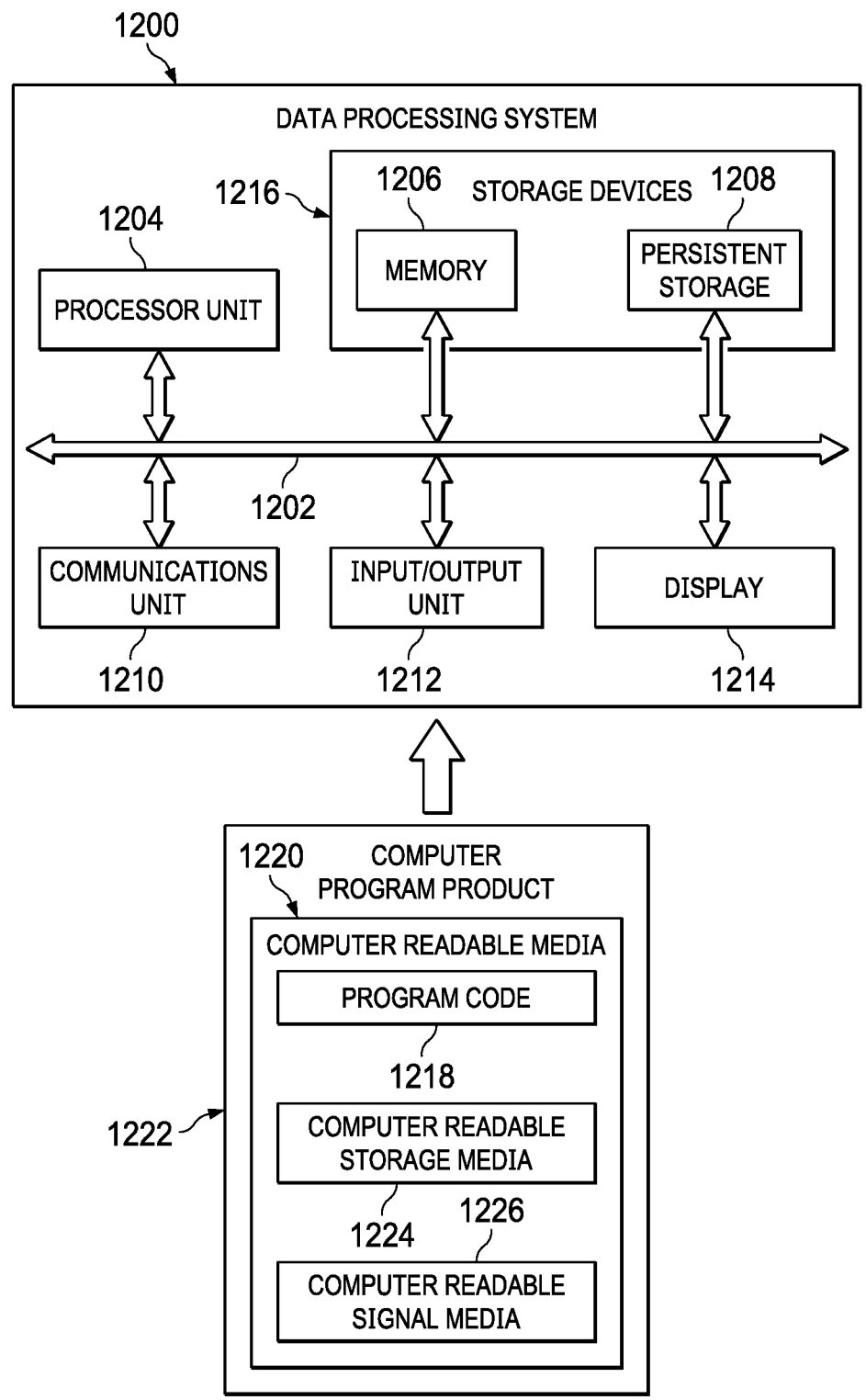
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, client computer 110, client computer 112, and client computer 114 in FIG. 1. Data processing system 1200 can also be used to implement enterprise system 200 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device.

Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 804 using computer-implemented instructions, which may be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

The descriptions of the various embodiments has been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of identifying requirements in a document, comprising:
   receiving the document;
   identifying component information in the document using a component model;
   identifying attribute related information in the document using an attribute model, wherein the attribute model is a machine learning model that is trained using training documents;
   merging the component information and the attribute related information identified in the document;
   identifying the requirements in the document from the merged component information and attribute related information; and
   using the requirements identified in the document to produce a product, wherein the component model is a domain-specific model that is applicable for a specific domain; and the attribute model is a common model that is applicable for all domains; wherein a domain model comprises the component model and the attribute model, and wherein the domain model is continuously improved by user feedback and self-learning.

2. The computer-implemented method of claim 1 further comprising:
   receiving user feedback on the requirements identified in the document; and
   modifying at least one of the component model and the attribute model in response to the user feedback.

3. The computer-implemented method of claim 1, wherein the component model comprises:
   a general component corpus of general terms for components from a plurality of domains; and
   a domain-specific component corpus of domain-specific terms for components for a specific domain.

4. The computer implemented method of claim 3 further comprising generating the component model by:
   generating a basic component corpus of terms for components from one or more of documents, websites, and operator input;
   distinguishing the terms of the basic component corpus into general terms and specific terms;
   calculating inverse document frequency scores of term pairs; and
   calculating reusability and finding the part that can be reused for the new domain from the general component corpus based on the inverse document frequency scores.

5. The computer-implemented method of claim 1, wherein the attribute related information comprises:
   an attribute of a component;
   a value for the attribute;
   a guide word describing a relationship between the value and the attribute; and
   a unit of the value.

6. A system for identifying requirements in a document, comprising a data processing system configured to:
   receive the document;
   identify component information in the document using a component model;
   identify attribute related information in the document using an attribute model, wherein the attribute model is a machine learning model that is trained using training documents;
   merge the component information and the attribute related information identified in the document;

identify the requirements in the document from the merged component information and attribute related information; and use the requirements identified in the document to produce a product, wherein the component model is a domain-specific model that is applicable for a specific domain; and the attribute model is a common model that is applicable for all domains; wherein a domain model comprises the component model and the attribute model, and wherein the domain model is continuously improved by user feedback and self-learning.

7. The system of claim 6, wherein the data processing system is further configured to:

receive user feedback on the requirements identified in the document; and modify at least one of the component model and the attribute model in response to the user feedback.

8. The system of claim 6, wherein the component model comprises:

a general component corpus of general terms for components from a plurality of domains; and a domain-specific component corpus of domain-specific terms for components for a specific domain.

9. The system of claim 8, wherein the data processing system is configured to generate the component model by:

generating a basic component corpus of terms for components from one or more of documents, websites, and operator input;

distinguishing the terms of the basic component corpus into general terms and specific terms;

calculating inverse document frequency scores of term pairs; and calculating reusability and finding the part that can be reused for the new domain from the general component corpus based on the inverse document frequency score.

10. The system of claim 6, wherein the attribute related information comprises:

an attribute of a component;

a value for the attribute;

a guide word describing a relationship between the value and the attribute; and a unit of the value.

11. A computer program product for identifying requirements in a document, the computer program product comprising a computer readable storage medium having program instructions embodied therewith, the program instructions executable by a device to cause the device to:

receive the document;

identify component information in the document using a component model;

identify attribute related information in the document using an attribute model, wherein the attribute model is a machine learning model that is trained using training documents;

merge the component information and the attribute related information identified in the document;

identify the requirements in the document from the merged component information and attribute related information; and use the requirements identified in the document to produce a product, wherein the component model is a domain-specific model that is applicable for a specific domain; and the attribute model is a common model that is applicable for all domains; wherein a domain model comprises the component model and the attribute model, and wherein the domain model is continuously improved by user feedback and self-learning.

12. The computer program product of claim 11, wherein the program instructions are executable by the device to cause the device to:

receive user feedback on the requirements identified in the document; and modify at least one of the component model and the attribute model in response to the user feedback.

13. The computer program product of claim 11, wherein the component model comprises:

a general component corpus of general terms for components from a plurality of domains; and a domain-specific component corpus of domain-specific terms for components for a specific domain.

14. The computer program product of claim 11, wherein the attribute related information comprises:

an attribute of a component;

a value for the attribute;

a guide word describing a relationship between the value and the attribute; and a unit of the value.

\* \* \* \* \*